US010693545B2

(12) United States Patent
Ho et al.

(10) Patent No.: US 10,693,545 B2
(45) Date of Patent: *Jun. 23, 2020

(54) DIFFERENT SECTOR ROTATION SPEEDS FOR POST-AMBLE PROCESSING OF A BEAM FORMING PACKET

(71) Applicant: Apple Inc., Cupertino, CA (US)

(72) Inventors: Keangpo R. Ho, San Jose, CA (US); Ling Su, Los Altos, CA (US)

(73) Assignee: Apple inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,900

(22) Filed: May 17, 2019

(65) Prior Publication Data

US 2019/0288758 A1 Sep. 19, 2019

Related U.S. Application Data

(63) Continuation of application No. 15/719,435, filed on Sep. 28, 2017, now Pat. No. 10,305,562.

(51) Int. Cl.
| H04B 17/00 | (2015.01) |
| H04B 7/06 | (2006.01) |
| H04W 72/08 | (2009.01) |
| H04W 16/28 | (2009.01) |
| H04B 7/08 | (2006.01) |
| H01Q 3/04 | (2006.01) |
| H01Q 21/00 | (2006.01) |

(52) U.S. Cl.
CPC ......... *H04B 7/0617* (2013.01); *H04B 7/0695* (2013.01); *H04B 7/088* (2013.01); *H04W 16/28* (2013.01); *H04W 72/085* (2013.01); *H01Q 3/04* (2013.01); *H01Q 21/0025* (2013.01)

(58) Field of Classification Search
CPC ..... H04W 52/24; H04W 52/21; H04W 52/36; H04W 52/40; H04W 52/50; G08C 17/00
USPC ........... 455/522, 67.11, 67.13; 343/763, 810, 343/824, 893
See application file for complete search history.

(56) References Cited

U.S. PATENT DOCUMENTS

| 6,556,845 | B1 | 4/2003 | Ide et al. |
| 6,661,378 | B2 | 12/2003 | Bloy |
| 8,630,590 | B2 | 1/2014 | Nanda et al. |
| 8,704,711 | B2 | 4/2014 | Wang et al. |
| 2011/0019603 | A1 | 1/2011 | Jeon et al. |

(Continued)

OTHER PUBLICATIONS

International Search Report and Written Opinion from PCT/US2018/048915, dated Dec. 12, 2018. Apple Inc., pp. 1-15.

(Continued)

*Primary Examiner* — Temica M Beamer
(74) *Attorney, Agent, or Firm* — Robert C. Kowert; Kowert, Hood, Munyon, Rankin & Goetzel, P.C.

(57) ABSTRACT

Post-amble processing of a beam forming packet may utilize different sector rotation speeds at different wireless communication devices. Power measurements may be captured for individual sectors of an antenna array with respect to a complete rotation of antenna sectors at another wireless communication device. The power measurements may be evaluated to identify a sector for directing a millimeter wave beam between the different wireless communication devices. In some embodiments, a second packet may be transmitted back using the identified sector to determine another sector for directing the millimeter wave beam between the different wireless communication devices.

20 Claims, 8 Drawing Sheets

(56) References Cited

U.S. PATENT DOCUMENTS

| | | |
|---|---|---|
| 2011/0280188 A1 | 11/2011 | Jeon et al. |
| 2016/0119043 A1 | 4/2016 | Rajagopal et al. |
| 2016/0197755 A1 | 7/2016 | Barriac et al. |
| 2017/0156067 A1 | 6/2017 | Huang |
| 2017/0207845 A1 | 7/2017 | Moon et al. |

OTHER PUBLICATIONS

Samsung, "The Impact of Beam Sweeping on RRM Measurement", R2-1709606 Resubmission, 3GPP TSG RAN WG2 # 99, Aug. 21-25, 2017, pp. 1-4.

DIFFERENT SECTOR ROTATION SPEEDS FOR POST-AMBLE PROCESSING OF A BEAM FORMING PACKET

This application is a continuation of U.S. patent application Ser. No. 15/719,435, filed Sep. 28, 2017, which is hereby incorporated by reference herein in its entirety.

TECHNICAL FIELD

This disclosure relates generally to wireless communication systems and techniques for directing directional wave signals between components of a wireless communication system.

BACKGROUND

Wireless communication systems are increasingly widespread. Additionally, there exist numerous different wireless communication technologies and standards. Some examples of wireless communication standards include IEEE 802.11 (WLAN or Wi-Fi, for example 802.11 a/b/g/n/ac/ax in the frequency band of 2.4 and/or 5 GHz, and 802.11 ad/ay in the band of 60 GHz), IEEE 802.15 (WPAN), IEEE 802.16 (WiMAX), and others.

Furthermore, as applications and devices continue to require higher levels of throughput for wireless communications, higher frequency waves are being used to transmit more data. For example, IEEE 802.11 ad provides for gigabit per second speeds using 60 GHz frequency band millimeter waves. However, high frequency waves, such as 60 GHz waves, cannot typically penetrate effectively walls or other solid structures. Also, such high-frequency waves may have greater decay because the reception of such waves may not be effectively received at other antennas than lower frequency waves, such that a range of a transmitter transmitting such high-frequency waves may be reduced as compared to a transmitter transmitting lower frequency waves.

In some wireless communication systems using high-frequency waves, such as 60 GHZ waves, beam forming techniques may be used to direct a high-frequency wave toward an intended receiver. Even if a clear line-of-sight is not available, the beam forming techniques may direct the wave via reflections toward an intended receiver. Additionally, if a line-of-sight of an established link between a transmitter and receiver becomes suddenly blocked, such systems may lose communication for non-trivial amounts of time while searching for new directions. The movement and rotation of the receiver or transmitter may require further beam forming operations to direct the signal.

SUMMARY

In various embodiments, different sector rotation speeds for post-amble processing of a beam forming packet may be implemented. Beam forming techniques may be implemented to identify optimal wireless beams to establish communication links between wireless computing devices. Wireless signals may be directed or shaped in different directions to obtain better signal strength to enhance performance between the wireless communication devices. As wireless communication devices may move, or blocking objects or signals may change the interference in a given location, optimal wireless beams may be identified to adapt to or otherwise overcome interference or blockage between wireless communication devices. In order to quickly restore communications that failed or degraded between two wireless communication devices, the rotation speeds for processing a beam forming packet to determine an optimal wireless beam may be different in order to capture power measurements between the different sectors of antenna arrays according to information in a post-amble portion of a single packet.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Wireless communication systems using high-frequency waves may communicate large amounts of data between devices. For example, millimeter waves having wavelengths between 1 millimeter and 10 millimeters (e.g. 30-300 GHz waves) may communicate data at rates at or greater than 1 gigabit per second. However, such waves may not be able to effectively penetrate walls or solid structures, in some circumstances. Also, a user of a device sending or receiving such high-frequency waves may block the waves by positioning the user's body or a part of the user's body between a transmitter and receiver of the wave. Objects, humans, and pets between a transmitter and receiver may, for example, block or otherwise disrupt the signal. In addition, a user of a device sending or receiving such waves may move the device such that a solid structure blocks a current link between a transmitter and a receiver. Additionally, in multi-user systems other users may position themselves or other objects in a link between a transmitter and receiver of such high-frequency waves, such that a high-frequency wave is blocked by the other user or the other objects.

Often when a communication link is established between a transmitter and receiver using a millimeter wave, such as between a user device and a base station, the transmitter and the receiver perform a scan or sweep operation to determine a best direction for the transmitter to direct a millimeter wave that is directed to the receiver, (e.g. a best link). For example, though millimeter waves may not effectively penetrate walls or other solid structures, millimeter waves may be reflected off of a wall, floor, ceiling etc. Thus, if a direct line of sight is not available between a transmitter of a millimeter wave and a receiver, other links, such as those using a reflection off of a surface may be chosen as alternative links to a clear line-of-sight link.

Also, a transmitter of a millimeter wave may include antenna arrays to transmit and receive millimeter wave signals. In such systems, different combinations of sending and receiving antenna elements and configurable parameters of such antenna elements may be adjusted to form a directional wave signal between a transmitter and a receiver (e.g., by applying a phase shift or amplitude-weight vector (AWV) to redirect the transmission of waves to shape the direction at which the wave signal is transmitted). Also, such systems may test different combinations of antenna elements and configurable parameters of the antenna elements to determine a best link from a transmitter to a receiver, such as a link between a base station and a user device. For example, a transmitter may determine a direction to transmit a millimeter wave that results in better reception of the millimeter wave at the receiver as compared to other directions. Such scans or sweeps may be performed to initially establish a link between a transmitter of a millimeter wave and a receiver of the millimeter wave. Also, such scans or sweeps may be at least partially repeated each time a current link is obstructed and a new link is established. In many cases, such scans or sweeps may take a non-trivial amount of time to perform, and for many applications interruptions in communication while such scans or sweeps are being performed may prevent the application from functioning properly. For example, when a link is obstructed, data exchange between a transmitter and receiver, such as a user device and a base station, may be interrupted until a scan or sweep is completed and a new link is established between the transmitter and the receiver. Such interruptions may cause poor performance of an application operating on a user device and may negatively impact a user experience. For example, in streaming video or audio applications, such interruptions may cause a negative user experience. In streaming video or audio, the buffering in the video display may be limited to reduce the cost. If the interruption is longer than the duration of the buffering, the video display may be frozen. For certain interactive gaming applications, the interruption needs to be a fraction of the interactive time. Otherwise, the video display may become unresponsive.

Various embodiments of different sector rotation speeds for post-amble processing of a beam forming packet are described herein. The downtime or latency devices experience to establish or re-establish communication links between devices may be significantly reduced by performing different sector rotation speeds for post-amble processing of a beam forming packet, which may reduce the number of transmissions (e.g., packets) between devices in order to determine an optimal direction of a communication link via a millimeter wave signal transmitted and received via identified transmission and reception sectors. Post-amble processing may, in various embodiments, be processing of data included in a portion of a data packet that occurs after a payload of the packet. For example, post-amble portions of the packet may, for instance, be an automatic gain control (AGC) portion appended to a payload portion which may allow for feedback for a receiving antenna to determine information based on the signal transmitted in the AGC portion of the packet. Antenna arrays may transmit or receive signals via sectors which may identify the direction to which the transmission or reception elements of the antenna array are directed. A sector may, in various embodiments, identify a pattern, shape, or other direction for transmitting or receiving the wave radiation (e.g., radio frequency (RF) signals, like millimeter waves) via antenna (e.g., using multiple antennas in an antenna array). To determine an optimal direction of a communication link, both a transmission sector for a wireless communication device and a reception sector for the other wireless communication device may be determined.

Figure 1A:
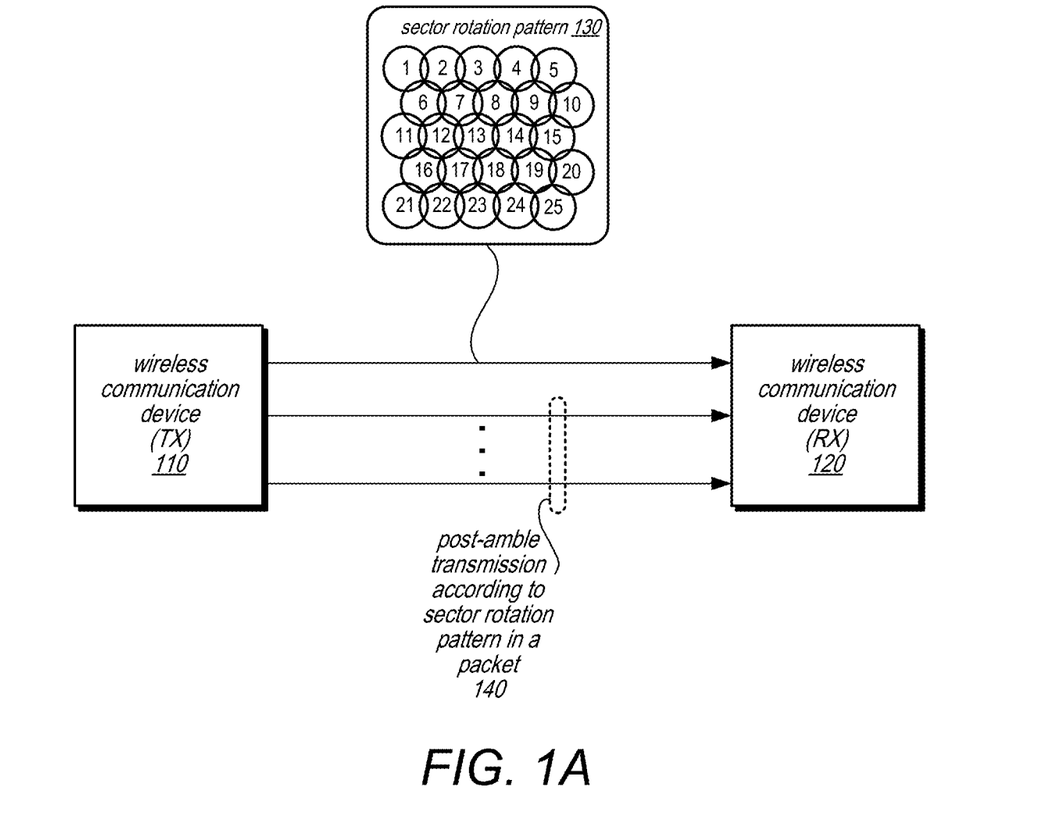
FIGS. 1A-1B illustrate different sector rotation speeds for post-amble processing of a beam forming packet, according to some embodiments.

FIG. 1A illustrates an example transmission to begin determining the optimal transmission (TX) and reception (RX) sectors, according to some embodiments. Wireless communication device 110, transmitter (TX), may prepare to begin transmission of a packet for determining the TX and RX sectors. Sector rotation pattern 130 may be provided to wireless communication device (RX) 120, so that wireless communication device 120 can capture power measurements for the different transmission sectors according to the sector rotation pattern at a different rotation speed, as discussed below with regard to FIGS. 1B and 3-6. Sector rotation pattern 130 may be provided as part of the same packet that includes post-amble transmission 140 according to sector rotation pattern 130 (e.g., via a preamble, header, or payload as discussed below with regard to FIG. 3) or may be provided as part of a setup operation, as discussed below with regard to FIG. 5. Some parameters of the sector rotation pattern, for example, may be provided as the capabilities of the wireless communication devices in the association process.

Figure 1B:
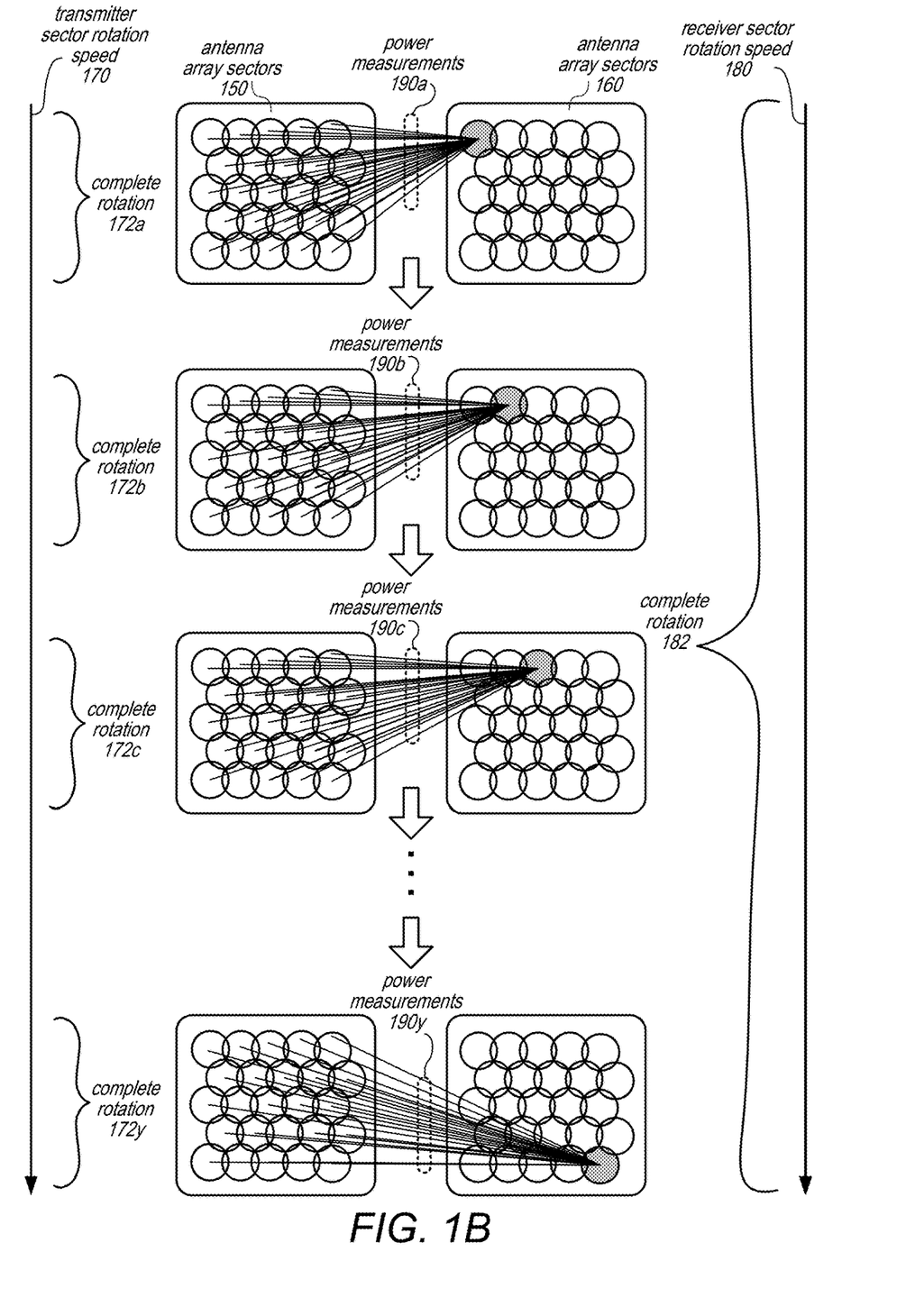

FIG. 1B illustrates an example of different rotation speeds for post-amble transmission of beam forming packet, according to some embodiments. Antenna array sectors 150 may provide a logical illustration of different antenna array TX sectors for a wireless communication device (TX) 110. Antenna array sectors 160 may provide a logical illustration of antenna array sectors for wireless communication device (RX) 120. Sector rotation speeds for each antenna array may differ, in various embodiments. For example, transmitter sector rotation speed 170 shows complete rotations through all antenna array sectors 150, complete rotation 172a, 172b, 172c through 172y. However, receiver sector rotation speed 180 may perform a single completion rotation 182 in the same period of time (or overlapping periods of time). In this way, power measurements 190 for one receiver antenna array sector 160 can be captured for each antenna array sector 150, in some embodiments. For example, power measurements 190a may be captured for each antenna array sector 150 as it rotates according to receiver sector rotation speed 170, while the first sector of antenna array sectors 160 remains.

At the time the rotation to the next antenna array sector of antenna array sectors 160 occurs, rotation may begin again for antenna array sectors 150. Such differing rotation speeds may allow similar power measurements, such as power measurements 190b and 190c through 190y, to be captured, allowing for an optimal receiver sector at wireless communication device 120 to be selected based on the captured power measurements. Note that although FIG. 1B illustrates synchronized rotations, with a complete rotation 172 aligning with a rotation to a new sector in antenna array sectors 160, in other embodiments, the rotations need not be synchronized. Antenna array sectors 160 could, for example rotate half-way through the complete rotation 172 of antenna array sectors 150 and still capture power measurements for each antenna array sector 150. Thus, the logical illustration provided in FIG. 1B is not intended to be limiting as to the synchronization of sector rotations at different wireless devices, but merely illustrates an example of the differing rotation speeds. FIG. 1B shows only one receiving antenna array, for example. For a wireless device having multiple antenna arrays, all arrays in 120 may rotate their corresponding sectors simultaneously to capture power measurements for all sectors in all antenna arrays, in some embodiments.

Figure 2:
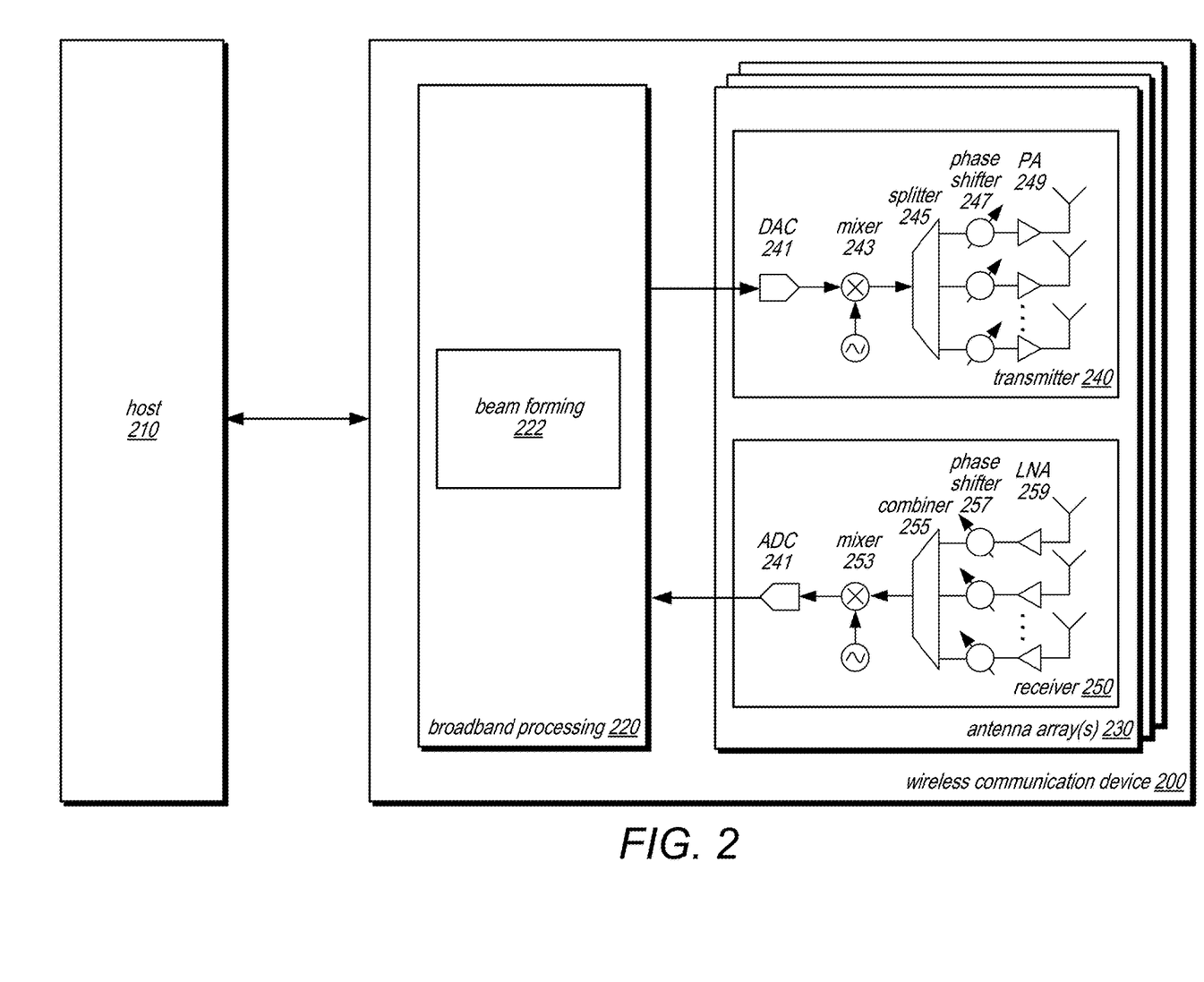
FIG. 2 illustrates a wireless communication device that implements different sector rotation speeds for post-amble processing of a beam forming packet, according to some embodiments, according to some embodiments.

FIG. 2 illustrates a wireless communication device that implements different sector rotation speeds for post-amble processing of a beam forming packet, according to some embodiments. Wireless communication device 200 may be implemented, in some embodiments, to provide wireless communications for host 210 (e.g., over millimeter wave radio frequencies). As discussed below with regard to FIG. 7, host 210 may implement a network interface (e.g., a network interface card (NIC)) which may generate, send, and receive data over a network using different networking protocols which may be established wireless communication links established and maintained by wireless communication device 300.

Wireless communication device 200 may be implemented as part of a larger circuit for host 210 or component or may be a separate circuit or hardware component connected to host 210. For example, some or all of wireless communication device 200 may be implemented on dedicated circuitry or hardware, including, but not limited to, an Application Specific Integrated Circuit (ASIC), system-on-a-chip (SoC), or field programmable gate array (FPGA), among others. Wireless communication device 200 may implement broadband processing 220, in some embodiments which may include a processor (e.g., such as processor 1010 in FIG. 7) and memory (e.g., such as memory 1020 in FIG. 7) and/or dedicated circuitry to perform digital processing of radio frequency (RF) signals received via antenna arrays 230. Broadband processing 220 may perform various management or request-handling operations to implement communications to and from host 210 (e.g., via a network interface like network interface 1040 in FIG. 7).

Broadband processing 220 may, in some embodiments, implement beam forming processing 222. Beam forming processing 222 may manage beam forming processing for establishing communication links with other wireless communication devices using directed RF communications (e.g., millimeter wave beams). For millimeter wave beams, broadband processing 220 may implement different techniques for establishing, maintaining, and recovering communication links. Beam forming 222 may, for instance, perform sector level sweeps to identify optimal sectors to utilize for transmitting and receiving a millimeter wave beam to another wireless communication, in some embodiments. Multiple short packets, sector sweep (SSW) frames, may be sent from individual sectors to an antenna array at another wireless communication device that may receive the packets utilizing an omnidirectional antenna pattern. Beam forming 222 may implement beam tracking to find an optimal receiver amplitude weight vector (AWV) after an optimal transmitter sector has been identified, in some embodiments.

Beam forming 222 may implement beam refinement protocol (BRP) techniques, in some embodiments. BRP techniques may utilize a post-amble portion of a packet sent from an initiator to a responder (another wireless communication device implementing an antenna array). In some BRP techniques, the post-amble portion may include information that provides a training field, transmitted via one of the transmission sectors or AWV of an initiator. Based on the channel measurement at the post-amble of the packets, an optimal receiver sector or AWV may be determined for receiving millimeter wave beams between the initiator and responder. In some BRP techniques, the post-amble portion may change the transmitted AWV to test various orientations to conduct channel measurement. Based on the response from the receiver back to the transmitter, an optimal transmitter sector or AWV may be determined for directing millimeter wave beams between the initiator and responder. For some BRP techniques, only received training may be used and the corresponding transmitter AWV of the same station may be determined by reciprocity.

Figure 3:
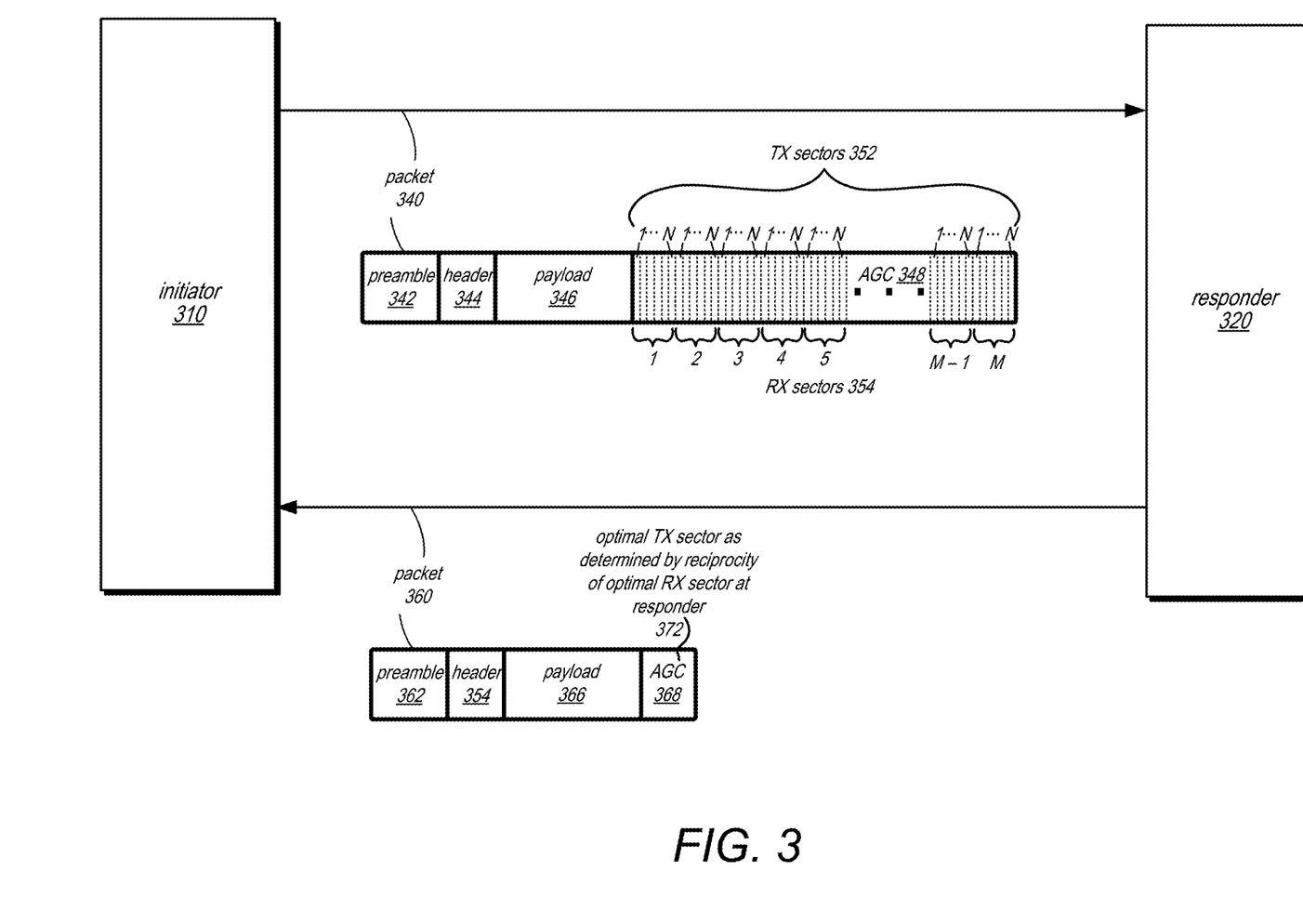
FIG. 3 illustrates example beam forming packets that may be transmitted implementing different sector rotation speeds for post-amble processing of a beam forming packet, according to some embodiments.

While sector level sweeps and BRP techniques may provide different ways to determine an optimal direction for a millimeter wave beam (e.g., by determining a pair of optimal phase vectors or AWV to shape the transmission and reception to achieve the optimal direction for the beam), latency sensitive applications may be unable to wait for such techniques to determine an optimal direction for a millimeter wave beam, as noted above. In various embodiments, beam forming 222 may implement different sector rotation speeds for post-amble processing of a beam forming packet to significantly reduce the number of packets (e.g., to two packets as illustrated in FIG. 3) according to the techniques discussed below with regard to FIGS. 3-6. Instead of exchanging many packets, as with the other BRP and sector sweep techniques discussed above, a beam forming technique that implements different sector rotation speeds for post-amble processing of a beam forming packet can significantly reduce the latency to determine an optimal direction for a millimeter wave beam between two wireless communication devices (e.g., an≈75% reduction in latency).

Wireless communication device 200 may implement antenna array(s) 230, in various embodiments, which may include both transmitters 240 and receivers 250 for transmitting and receiving RF signals (e.g., millimeter waves). Transmitter 240 may implement digital to analog converter (DAC) 241. DAC 241 may receive digital signals from broadband processing 220 and convert the digital signal into an analog signal. Mixer 243 and splitter 245 may split the analog signal for transmission via separate antennas. Phase shifter 247 may implement a phase vector to time the transmission of the analog signals via the different antennas in order to create a desired beam direction or shape (e.g., to transmit the wireless beam via a particular sector). Power amplifiers (PA) 249 may amplify the signal power prior to transmission via the antennas. In one embodiment, phase shifter 247 may comprise of amplitude adjustment for a full implementation of AWV in both amplitude and phase. Similarly, antenna array(s) 230 may implement receiver 250 which may receive an RF signal via antennas, increase the power of the signal via a low noise amplifier (LNA) 259, shape the timing of signals via phase shifter 257 (e.g., according to a phase vector to direct the receipt of the signal using a particular receiver sector specified by the phase vector), combine the signal using combiner 255 and mixer 243, and convert the analog signal to a digital signal via analog to digital converter (ADC) 241, in some embodiments.

Host 210, which may implement or connect to wireless communication device 200 may implement wireless communication device as part of a larger circuit, chip, or other host hardware or may be coupled to the wireless communication device. Host 210 may, in some embodiments, program or otherwise specify control settings or configurations for wireless communication device 200, such as enabling various types of beam forming techniques, including enabling or disabling BRP techniques that utilize different sector rotation speeds for post-amble processing of a beam forming packet, as discussed below. In at least some embodiments, host 210 may be implemented as part of a wireless communication system that utilizes multiple different relay docks or stations, user devices (e.g., wearable mobile computing devices), and base stations, among others.

FIG. 3 illustrates example beam forming packets that may be transmitted implementing different sector rotation speeds for post-amble processing of a beam forming packet, according to some embodiments. Initiator 310 may be a wireless communication device, like wireless communication device 200 in FIG. 2., that may initiate a beam forming with responder 320, which may be another wireless communication device (e.g., similar to or different than communication device 200) as responder. For example, initiator 310 may be a wireless access device, such as router, relay device, or other networking device, and responder 320 may be a mobile computing device (e.g., a laptop, mobile phone or wearable technology), or vice versa.

Initiator 310 may generate packet 340, which may be a beam forming packet that includes fields, portions, or sections for implementing different sector rotation speeds for post-amble processing of a beam forming packet, in some embodiments. For example, packet 340 may include preamble 342, header 344, and payload 346, which may communicate various information about initiator 310 and the beam forming to be performed, such as a rotation speed and a pattern for transmitting from sectors at initiator 310, as well as other information usable for other functions or by other devices. For example, other devices may intercept the packet and be able to use payload 346 information to perform navigation (e.g., for wireless triangulation techniques). In some embodiments, the preamble 342, header 344, and payload 346 may just serve as an indicator to other devices in the network to signal the duration of the packet 340 to avoid packet collision in the air.

Transmission of packet 340 may include a post-amble portion, which may occur once payload transmission 346 is concluded. Thus, in some embodiments, data of packet 340 prior to the post-amble period may be transmitted according to a pre-determined optimal transmission sector. Once post-amble processing begins, transmission of packet 340 may be performed according to a rotation pattern and rotation speed, as discussed above with regard to FIGS. 1A-1B. The post-amble period of packet 340 may include an automatic gain control (AGC) portion 348 which may include test fields for performing power measurement. Transmitter (TX) sectors 352 may be transmitted according to a rotation pattern (e.g., sector 1, 2, 3, and so on till sector N) which may be repeated according to the number of receiver (RX) sectors 354 of responder (e.g., denoted from 1 to M), in some embodiments.

As discussed in detail below with regard to FIGS. 4-6, responder 320 may process the received packet 340, rotating RX sectors so as to capture power measurements for each of the TX sectors at each RX sector before rotating to a next RX sector. In some embodiments, the synchronization of TX sector rotations can be sufficiently accurate (e.g., above a confidence threshold or in response to receiving the preamble 342, header 344, and payload 346 prior to AGC 348) to determine both an optimal RX sector at responder 320 and TX sector at initiator 310 based on the captured power measurements. In such scenarios, responder 320 may respond to initiator 310 indicating the optimal TX and RX sector in a packet communication (not illustrated) as a response to the packet 340.

In scenarios where the synchronization of TX sector rotations is not sufficiently accurate, then responder 320 may generate a packet 360 to perform further beam forming with initiator 310 in order to determine a TX sector at initiator that is optimal for communication between initiator 310 and responder 320. As before, packet 360 may include a preamble 362, header, 354, and payload 366, some or all of which may indicate rotation speed and pattern of transmission of sectors from responder 320 (e.g., 1 sector, the optimal RX sector 372), as well as other information usable for other functions or by other devices, in some embodiments. In some embodiments, the preamble 362 header 354, and payload 366 may serve as an indicator to other devices in the network to signal the duration of the packet 360 to avoid packet collision in the air.

In at least some embodiments, packet 360 may include an AGC portion 368 which may include a test field using the optimal TX sector (determined by responder 320 using the reciprocal sector of the RX sector at responder 320 that received the signal with the greatest power measurement from initiator 310). In some embodiments with multiple antenna arrays in responder 320, the optimal antenna array having the greatest power measurement in one of its sector may be used to transmit packet 360. As discussed below with regard to FIG. 6, initiator 310 may then sweep or otherwise rotate the RX sectors of initiator 310 to collect power measurements, identify the sector with the greatest power measurement and perform reciprocity to determine the optimal TX sector, resulting in initiator 310 having determined the optimal TX sector to use for sending millimeter wave beams to responder 320 and responder 320 having determined the optimal TX sector to use for receiving millimeter wave beams from initiator 310, in some embodiments. In some embodiments with multiple antenna arrays in initiator 310, the antenna array with the best performance may also be determined.

Although FIGS. 2-3 have been described and illustrated an example wireless communication device and beam forming packet exchange, the various techniques and components illustrated and described in FIGS. 2-3 may be easily applied to wireless communication devices. For example, wireless communication devices with a single antenna array or different broadband processing or radio frequency channel configurations may implement different sector rotation speeds for post-amble processing of a beam forming packet. As such, FIGS. 2-3 are not intended to be limiting as to other embodiments of a wireless communication device that may implement different sector rotation speeds for post-amble processing of a beam forming packet.

Figure 4:
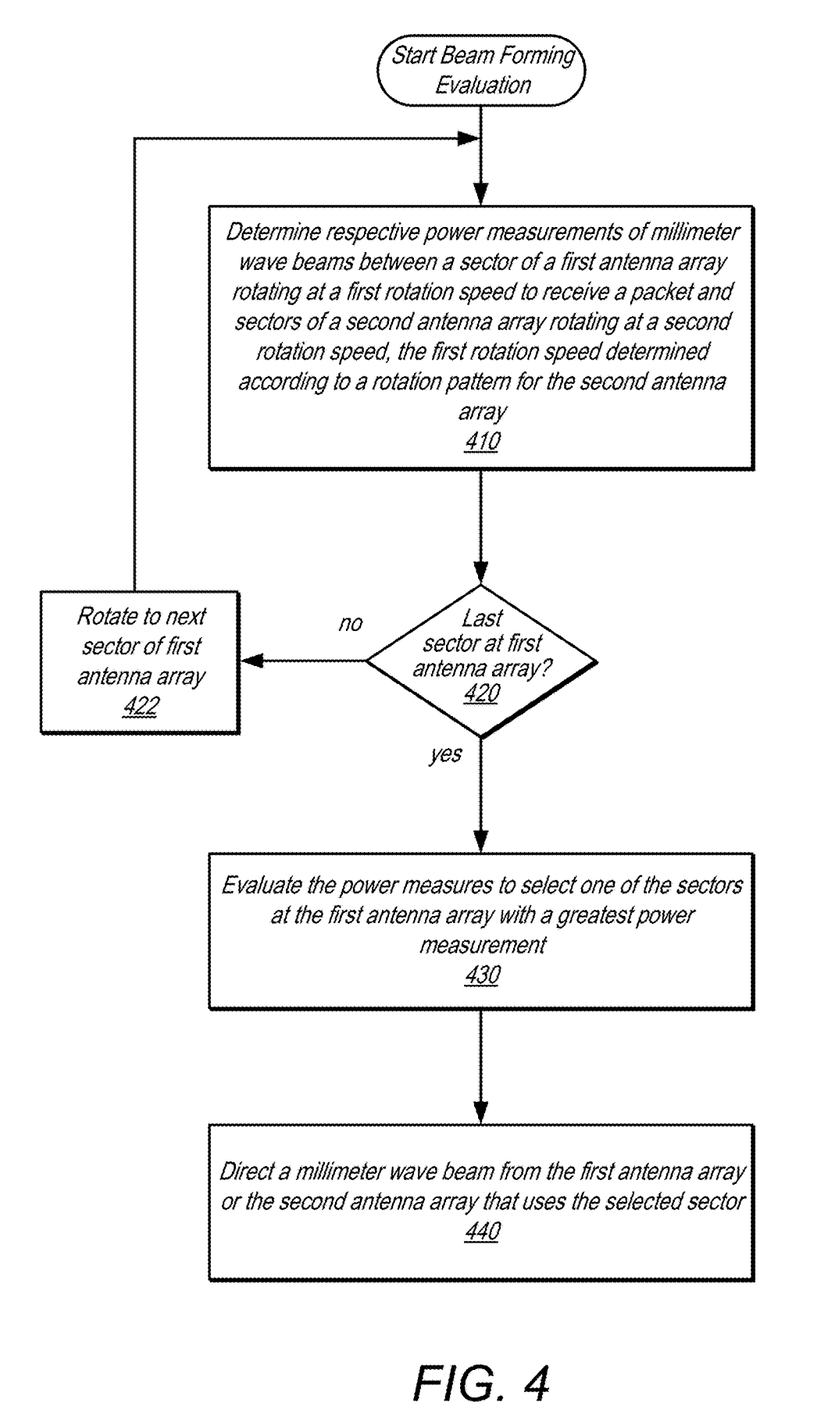
FIG. 4 is a high-level flowchart illustrating various methods and techniques to implement different sector rotation speeds for post-amble processing of a beam forming packet, according to some embodiments.
Figure 5:
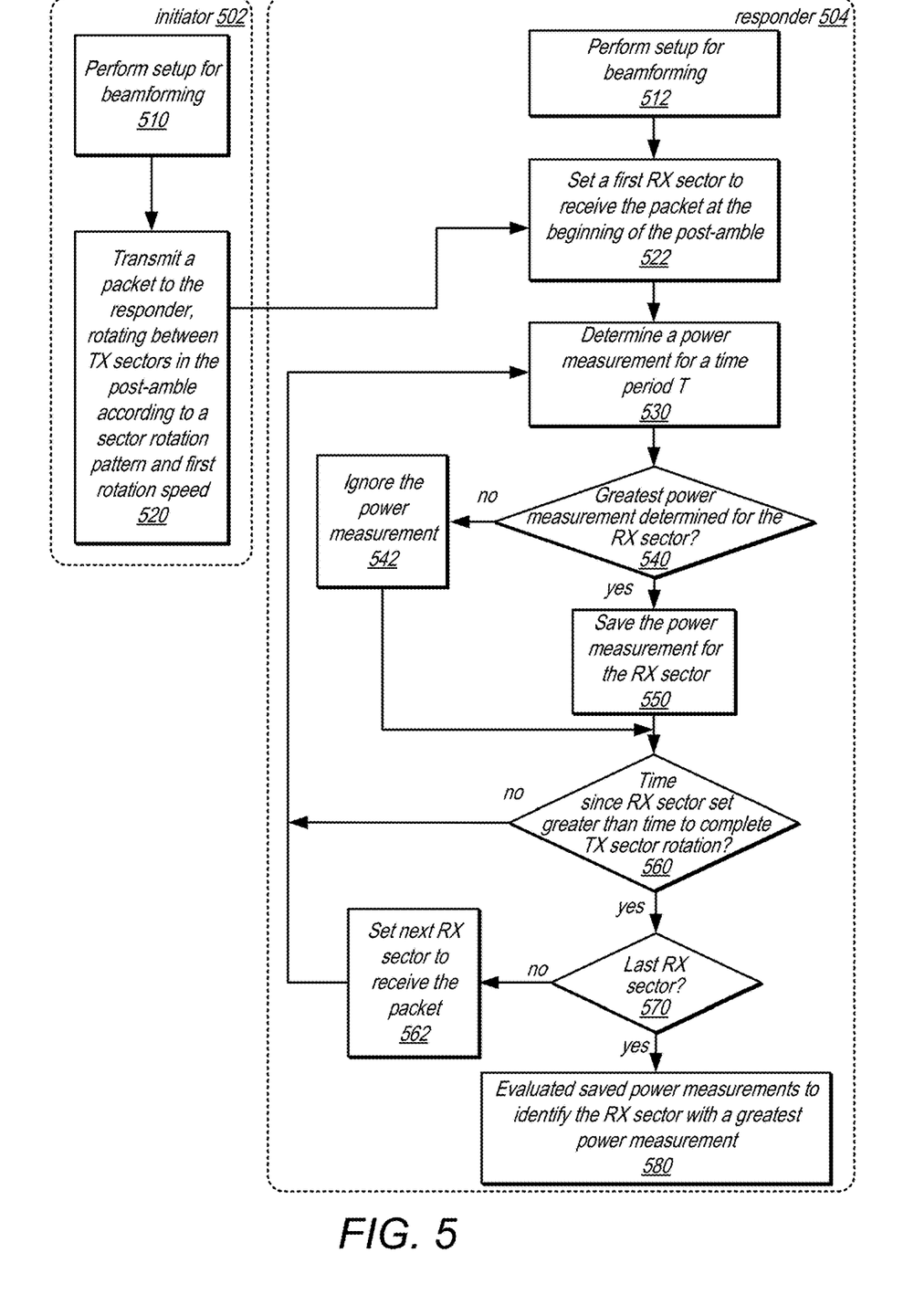
FIG. 5 is a high-level flowchart illustrating various methods and techniques to implement selecting an optimal reception sector at a responder receiving a packet of a beam forming protocol, according to some embodiments.

FIG. 4 is a high-level flowchart illustrating various methods and techniques to implement different sector rotation speeds for post-amble processing of a beam forming packet, according to some embodiments. Various different wireless communication devices may implement the various methods and techniques described below, including FIGS. 5 and 6, either singly or working together. Therefore, the above examples and or any other systems or devices referenced as performing the illustrated method, are not intended to be limiting as to other different components, modules, systems, or configurations of systems and devices that transmit or receive radio frequency signals.

Different events may trigger beam forming evaluation. For example, signal strength of a link between wireless communication devices may fall below a threshold value or failure of a signal or communication link between wireless devices may be detected, in some embodiments. In some embodiments, multiple types of beamforming evaluations or protocols may be implemented in wireless devices. Intelligent selection of a type of beam forming protocol may be performed based, at least in part, on the event that triggers beam forming evaluation. For example, configuration settings or other modes for a wireless communication device may be set which determine whether beam forming evaluation techniques, such as those discussed below with regard to FIGS. 4-6, are performed in the event of a beam forming evaluation, or if other beam forming refinement protocols are utilized (e.g., BRP protocols specified for IEEE 802.11 standards, such as 802.11ad or 802.11ay).

Beam forming evaluation may begin as a result of the transmission a beam forming protocol packet, in some embodiments. As indicated at 410, respective power measurements of millimeter wave beams between a sector of a first antenna array between a sector of a first antenna array rotating at a first rotation speed to receive a packet (e.g., the BRP packet) and sectors of a second antenna array rotating at second rotation speed. The difference in rotation speeds between the sectors of the antenna arrays may be determined according to a rotation pattern for the second antenna array. For example, if the rotation pattern for the second antenna array indicates that it will complete a cycle of rotations through all sectors of the second antenna array within time X, then the rotation speed of the first antenna may be determined so that each rotation of a sector for the first antenna may cover all of the sectors of the second antenna array. In one embodiment as shown in FIG. 3, the duration of X may include the rotation of 1 to N sectors in packet 340 of FIG. 3. Thus, in at least some embodiments, the first rotation speed may be slower than the second rotation speed (e.g., first rotation speed per sector≈time Y, which may be longer than second rotation speed for all sectors≈X such that the first rotation can capture all variations of the second rotation, see example of 190*a*, . . . , 190*y* in FIG. 1B). In one embodiment, as shown in FIG. 3, the duration of Y may be equal to rotations between sectors 1 to M for packet 340. Power measurements of the millimeter wave beams may be captured and stored for subsequent analysis, in some embodiments. In some embodiments, only some of the determine power measurements may be retained. For example, as discussed below with regard to FIGS. 5 and 6, multiple power measurements for a sector may be determined, with only the greatest power measurement retained for comparison with the power measurements of other sectors.

Once the power measurements are determined, the first antenna may rotate to the next sector of the first antenna array, as indicated at 420, if the sector at the first antenna array is not the last sector, as indicated by the negative exit from 420. If, however, the sector of the first array is the last sector, then as indicated at 430, the power measures may be evaluated to select one of the sectors at the first antenna array with a greatest power measurement. For example, the power measures may be stored or associated with individual sectors at the first array. The stored measures may be scanned to locate the sector associated with the greatest power measurement.

As indicated at 440, a millimeter wave beam may be directed from the first antenna array or the second antenna array that uses the selected sector, in some embodiments. For example, the above beam forming evaluation techniques may be implemented between an initiating wireless communication device and a responding wireless communication device. The initiating wireless communication device may send the packet indicating a rotation pattern of TX sectors that is performed once, cycling through all TX sectors in X time. Based on the pattern indication of performance of a single cycle, the responding wireless communication device may determine a rotation speed that is fast to complete an entire cycle of receiving sectors in the time it takes to complete one transmitting sector at initiator (e.g., responder rotations speed=(X/number of TX sectors at initiator)/number of sectors at responder), in some embodiments. Alternatively, as discussed below with regard to FIGS. 5 and 6, the initiator may indicate a rotation pattern that performs multiple complete cycles of TX sectors in X time, which the initiator can use to determine the speed in which to rotate between each RX sector in a single cycle. Millimeter wave beams may be directed by programming or configuration phase shifts to transmit and receive signals from the respective antenna arrays according to phase vectors that can direct the millimeter beams to the identified sectors.

In some scenarios, as noted above, either the initiator or the responder may perform a rotation of sectors according to a rotation speed that allows the other to send to or receive from a complete rotation of sectors so that power measurements for millimeter wave beams between the set of sectors at one antenna array and one of the sectors of the other antenna array may be determined. In one embodiment, a wireless communication device that is an initiator of beam forming may perform the complete rotation of sectors at speed to take measurements for each sector of a wireless communication device that is a responder. FIG. 5 is a high-level flowchart illustrating various methods and techniques to select an optimal reception sector at a responder receiving a packet of a beam forming protocol, according to some embodiments.

As indicated at 510 and 512, initiator 502 and responder 504, may perform setup operations to accomplish beam forming. For example, setup may include establishing communications between the initiator 502 and responder 504, such as by sending a control PHY packet from either the initiator to responder 504, or from responder 504 to initiator. Setup may be performed prior to link degradation, loss, or other trigger event that is causes initiator 502 to begin beam forming with responder 504, in some embodiments. Setup operations may be periodically performed, or in response to other events (e.g., completion of a beacon broadcast by either initiator 502 or responder 504, or if a non-BRP packet is not received within a period of time). Setup may include the exchange of information that can indicate a rotation pattern and/or speed for initiator 502 so that responder 504 can determine a rotation speed for rotating between RX sectors (e.g., sector rotation occurs every T µs). In one embodiment, the setup operations may be defined in certain pre-defined anchor points. If no packet is detected at or immediately prior to the anchor points, setup operation may be implicitly established, in some embodiments.

As indicated 520, initiator 502 may transmit a packet to responder 504, rotating between TX sectors in the post-amble according to a sector rotation pattern and first rotation speed, in some embodiments. For example, as discussed above with regard to FIG. 3, the post-amble rotation of an antenna array of initiator 502 may include respective training fields within the AGC field, in some embodiments. The preamble, header, and/or payload of the packet may be received at responder 504, in some embodiments, indicating the rotation pattern and/or speed for the post-amble transmission of initiator 520, in some embodiments, in lieu of or to replace such information that may have been obtained when performing setup (e.g., at elements 510 and 512 respectively). As indicated at 522, responder 504 may set a first RX sector to receive the packet the beginning of the post-amble.

As indicated at 530, a power measurement for a time period T may be determined, in some embodiments, by responder 504. Time period T may be set according to a desired number of power measurements to obtain for a TX sector of initiator 502 (e.g., longer time period for more power measurements and shorter time period for less power measurements) and thus T may be less than or equal to a period of time that a single TX sector is transmitted before rotating to a next TX sector at initiator 502 in the post-amble. A determined power measurement may be compared with other power measurements for the RX sector. As indicated at 542, if the power measurement is not the greatest power measurement determined for the RX sector, the power measurement may move forward. If, however, as indicated by the positive exit from 540, the power measurement is the greatest power measurement determined for the RX sector, then the power measurement may be saved, as indicated at 550.

Power measurements may continue to be determined and compared with other power measurements for a current RX sector at responder 504 until, as indicated at 560, the time elapsed since the current RX sector was set is greater than a time to complete TX sector rotation at initiator 520. If the current RX sector is not the last RX sector, as indicated by the negative exit from 570, then a next RX sector to receive the packet 562 may be set at responder to continue processing the post-amble of the packet received from initiator 502. If the RX sector is the last RX sector, then the saved power measurements may be evaluated to identify the RX sector with a greatest power measurement, in some embodiments, as indicated at 580. In some embodiments where a responder has multiple antenna arrays, all the antenna arrays may have its sectors rotate simultaneously to determine both the RX sectors and the corresponding array having the largest measurement power.

As discussed above with regard to FIGS. 4 and 5, in some scenarios, some or all of the preamble, header, and/or payload of a BRP packet sent from an initiator to another wireless communication device may not be received or detected at a responder. However, beam forming can continue by sending a responsive packet to the initiator, allowing the initiator to determine which sector of the initiator to target with a millimeter wave beam. FIG. 6 is a high-level flowchart illustrating various methods and techniques to select an optimal transmission sector for an initiator of a beam forming protocol, according to some embodiments.

As indicated at 610, one of the transmission (TX) sectors of the responder 504 may be selected based on the RX sector of the responder 504 that was determined to have the greatest power measurement, in some embodiments. For example, the reciprocal TX sector at responder 504 may be identified according to the selected RX sector. As indicated at 620, a packet indicating the selected TX sector may be transmitted using the selected TX sector. As part of transmitting the beam forming packet, responder 504 may perform a post-amble transmission that lasts for a time T1, in some embodiments. As noted above in FIG. 3, the beam forming packet may include an AGC field, different portions of which allow the rotation of RX sectors of initiator 502. The post-amble transmission may perform a rotation between the different TX sectors of responder 504 that is completed at time period T1.

Figure 6:
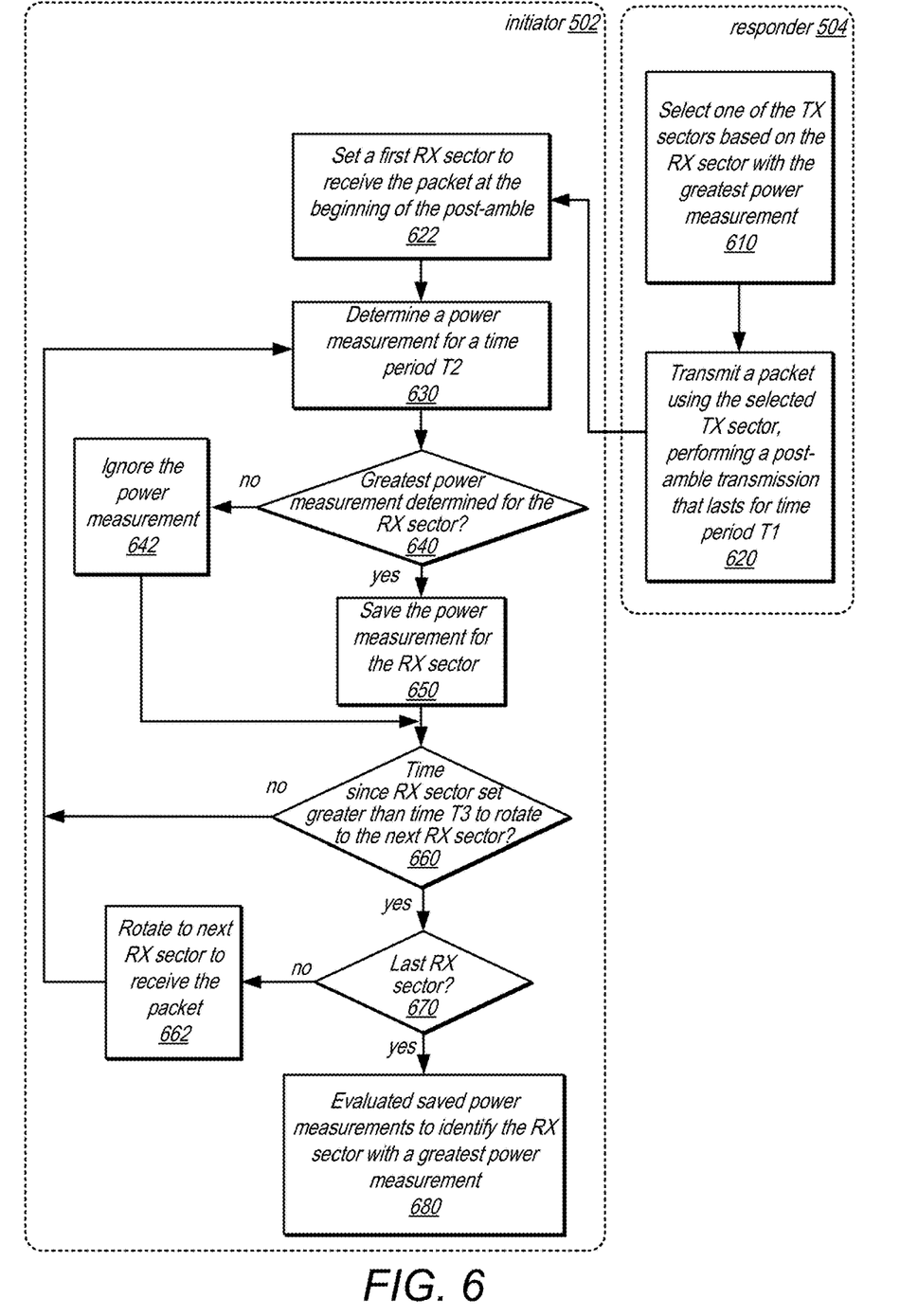
FIG. 6 is a high-level flowchart illustrating various methods and techniques to selecting an optimal transmission sector for an initiator of a beam forming protocol, according to some embodiments.

Although not illustrated in FIG. 6, in some embodiments, initiator 502 may not receive the packet from responder 504. Error handling may be implemented in the event a failure occurs during the beam forming process. For example, an elapsed time threshold may be evaluated at the initiator 502. If a packet from responder 504 is not received within the elapsed time threshold, then initiator 502 may assume a failure in the receipt of the first packet, and re-try by resending the packet (e.g., according to the packet transmission techniques discussed above with regard to element 520 of FIG. 5), in some embodiments.

Initiator 502 may set a first RX sector to receive the packet at the beginning of the post-amble phase, in some embodiments. A power measurement for a time period T2 may be determined, as indicated at 630. Time T2 may be set according to the number of desired power measurements for a sector. If, for example, multiple power measurements are desired, then the difference between T2 and the total time to perform a sector rotation (e.g., time T3 as discussed below) may be increased. Alternatively, if, for instance, a single power measurement is desired for each RX sector, then time T2 may be set to approximately equal the total time to perform the RX sector rotation (e.g., where T2≈T3). If the determined power measurement is not greater, then the power measurement may be ignored, as indicated at 642. If the determined power measurement is greater than any other determined for the set RX sector, the power measurement may be saved for further evaluation (e.g., in a memory, register, or other location), as indicated at 650.

Power measurement determination(s) for the current RX sector may continue until a time elapsed since the RX sector was set is greater than a time T3 to rotate the RX sector at responder 504, as indicated at 660. Time T3 may be determined in various ways. For instance, time T3 may be approximately equal to the total time of the post-amble divided by the number of RX sectors at initiator 502 (e.g., T3≈T1/N sectors). If the time has not elapsed, then as indicated by the negative exit from 660, further power measurements may be determined. If the time has elapsed, then a determination may be made as to whether the current RX sector is the last RX sector initiator 502. If not, then a next RX sector may be selected to receive the packet, as indicated at 662. If so, as indicated at 680, then saved power measurements may be evaluated to identify the RX sector with a greatest power measurement.

Figure 7:
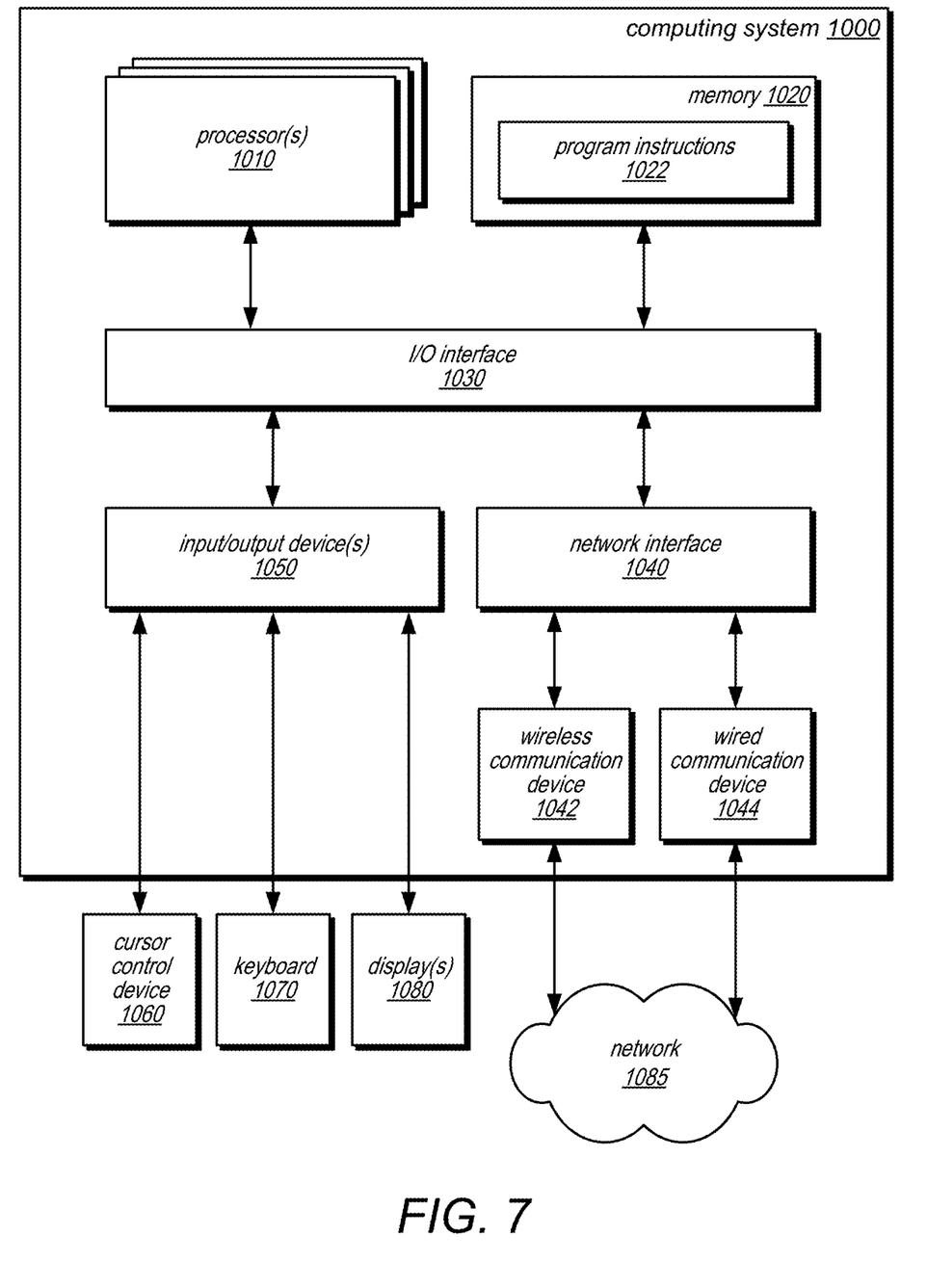
FIG. 7 is a logical block diagram of an example computer system, according to some embodiments.

FIG. 7 is a logical block diagram of an example computer system, according to some embodiments. The computer system 1000 may be configured to execute, include, or implement a host, wireless computing device, or perform any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a display device, a video recording device, a peripheral device such as a switch, modem, router, or in general any type of computing device, computing node, or electronic device.

Computer system 1000 includes one or more processors 1010 coupled to a system memory 1020 via an input/output (I/O) interface 1030. Computer system 1000 further includes a network interface 1040 coupled to I/O interface 1030, which may establish network connections over wireless communication device 1042 (as discussed above with regard to FIG. 2 and/or wired communication device 1044, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements (e.g., another device implementing another wireless communication device).

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 and/or other data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement an image sensor control application incorporating any of the functionality described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures (e.g., via a wireless communication device or similar features or components), any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol. Wired communication device 1044 may connect computing system 1000 via a cable (e.g., coaxial cable, twisted pair cable, or fiber optic link) to another networking device (e.g., router, switch, hub, etc.) which may over the course of one or multiple wired or wireless communication paths connect computing system 1000 to network 1085. Wireless communication device 1044, as discussed above with regard to FIG. 3 may implement radio wave communications to establish communication channels with other wireless enabled devices to provide network communications.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separated from computer system 1000 and may interact with one or more nodes of computer system 1000 through a wired or wireless connection, such as over network interface 1040.

As shown in FIG. 7, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, display devices, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, firmware, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    a first and second wireless communication device, respectively comprising a broadband processor and one or more antenna arrays;
    the first wireless communication device, configured to:
        provide an indication of a first rotation speed between a plurality of transmission sectors of the one or more antenna arrays at the first wireless communication device of the first wireless communication device as part establishing communications with the second wireless communication device;
        transmit a packet to the second wireless communication device, wherein the transmission of a post-amble portion of the packet is performed according to the first rotation speed provided to the second wireless communication device;
    the second wireless communication device, configured to:
        determine a second rotation speed between reception sectors of the one or more antenna arrays at the second wireless communication device according based on the provided first rotation speed to capture power measurements between individual ones of the reception sectors and the transmission sectors based on the receipt of the post-amble portion of the packet from the first wireless communication device;
        rotate between the reception sectors of the one or more antenna arrays at the second wireless communication device according to the second rotation speed;
        compare the power measurements to identify one of the reception sectors at one of the one or more antenna arrays at the second wireless communication device with a greatest power measurement; and
        transmit a second packet to the first wireless communication device using a transmission sector at one of the one or more antenna arrays at the second antenna array selected according to the identified reception sector.

2. The system of claim 1, wherein the first wireless communication device, is further configured to provide an indication of a rotation pattern between a plurality of transmission sectors of the one or more antenna arrays at the first wireless communication device; and wherein the determination of the second rotation speed between reception sectors of the one or more antenna arrays at the second wireless communication device is further based on the indication of the rotation pattern provided by the first wireless communication device.

3. The system of claim 1, wherein the packet includes a third rotation speed and wherein the determination of the second rotation speed between reception sectors of the one or more antenna arrays at the second wireless communication device is further based on replacing the first rotation speed with the third rotation speed when determining the second rotation speed.

4. The system of claim 1, wherein the first wireless communication device is further configured to perform the establishment of communications between the first wireless communication device and the second wireless communication device in response to a beacon broadcast from the first wireless communication device or the second wireless communication device.

5. The system of claim 1, further comprising a first host and a second host, wherein the first wireless communication device provides wireless communication to the first host, wherein the second host provides wireless communication to the second host, and wherein data is transmitted between the first and second host using a millimeter wave beam between the first and second wireless communication devices transmitted based, at least in part, on the identified reception sector at the second wireless communication device.

6. A method, comprising:
performing, by one or more wireless communication devices:
determining a first rotation speed for rotating between a plurality of sectors of a first antenna array based on an indication of a second rotation speed between a plurality of sectors of a second antenna array exchanged as part of establishing communications;
for individual ones of the plurality of sectors of the first antenna array rotating between the sectors at the first rotation speed to receive a packet:
determining respective power measurements of millimeter wave beams for the plurality of sectors of the second antenna array; and
evaluating the power measures to select one of the sectors at the first antenna array with a greatest power measurement of the respective power measurements; and
directing transmission of a millimeter wave beam from the first antenna array or the second antenna array that uses the selected sector.

7. The method of claim 6, further comprising receiving the packet from the second antenna array, wherein the packet includes a post-amble portion transmitted according to a rotation pattern for rotating between the sectors of the second antenna array.

8. The method of claim 7, wherein the sectors of the second antenna array are transmission sectors, wherein the sectors of the first antenna array are reception sectors, and wherein the selected sector is one of the reception sectors used to receive the millimeter wave beam transmitted from the second antenna array.

9. The method of claim 8, further comprising:
sending, by the first antenna array, a second packet to the second antenna array using a transmission sector at the second antenna array identified according to the selected reception sector of the first antenna array;
determining respective power measurements of millimeter wave beams between a plurality of reception sectors of the second antenna array and the identified transmission sector at the first antenna array; and
evaluating the respective power measures of the millimeter wave beams between the reception sectors of the second antenna array and the identified transmission sector at the first antenna array to select one of the reception sectors at the second antenna array with a greatest power measurement;
identifying one of the transmission sectors at the second antenna array based on the selected reception sector at the first antenna array;
wherein the directing of the millimeter wave beam uses the identified transmission sector of the first antenna array and the identified reception sector of the second antenna array transmit the millimeter wave beam.

10. The method of claim 7 wherein the determination of the first rotation speed for rotating between the plurality of sectors of the first antenna array is further based on replacing the second rotation speed with the third rotation speed when determining the first rotation speed.

11. The method of claim 6, wherein the determination of the first rotation speed for rotating between the plurality of sectors of the first antenna array is further based on an indication of the rotation pattern exchanged as part of establishing communications.

12. The method of claim 6, further comprising performing the establishing communications in response to a beacon broadcast from the first antenna array or the second antenna array.

13. The method of claim 5, further comprising determining the first rotation speed based, at least in part on a rotation pattern for rotating between the sectors of the second antenna array provided to a wireless communication device implementing the first antenna array.

14. A wireless communication device, comprising a broadband processor and at least one antenna array, the wireless communication device configured to:
perform a setup operation with another wireless communication device that exchanges a first rotation speed for performing the complete rotations of transmission sectors of another antenna array at the other wireless communication device;
perform a single complete rotation amongst reception sectors of an antenna array based on the indication of the first rotation speed to receive a packet from the other wireless communication device sent via the other antenna array that includes a post-amble portion of multiple complete rotations of the transmission sectors of the other antenna array;
capture at least one power measurement of a millimeter wave beam between individual ones of the reception sectors and the transmission sectors for different ones of the complete rotations of the transmission sectors;
evaluate the captured at least one power measurements for the individual reception sectors to select one of the reception sectors with a greatest power measurement; and
send another packet to the other antenna array at the other wireless communication device using a transmission sector at the wireless communication device identified according to the selected reception sector.

15. The wireless communication device of claim 14, wherein the identified transmission sector at the wireless communication device used to send the other packet is a reciprocal sector of the selected reception sector.

16. The wireless communication device of claim 14, further configured to perform the setup operation with the other wireless communication device in response to a broadcast beacon from the wireless communication device or the other wireless communication device.

17. The wireless communication device of claim 14, wherein the other packet identifies one of the transmission sectors of the other antenna array and the selected reception sector of the antenna array for establishing an optimal millimeter wave beam between the wireless communication device and the other wireless communication device.

18. The wireless communication device of claim 14, wherein the other packet includes a post-amble portion for the other wireless communication device to receive at different reception sectors of the other antenna array in order to identify one of the reception sectors of the other antenna array with a greatest power measurement captured between the identified transmission sector at the antenna array and the one reception sector at the other antenna array, wherein a reciprocal transmission sector of the identified one reception sector at the other antenna array and the selected reception sector of the antenna array are used to establish an optimal millimeter wave beam between the wireless communication device and the other wireless communication device.

19. The wireless communication device of claim 14, wherein the performance of the single complete rotation amongst reception sectors of the antenna array is further based on an indication of a rotation pattern exchanged as part of the setup operation.

20. The wireless communication device of claim 14, wherein the packet is sent from the other wireless communication device in response to a determination that a wireless signal strength between the wireless communication device and the other wireless communication device is below a strength threshold.

* * * * *